United States Patent [19]

Plog

[11] Patent Number: 5,301,306
[45] Date of Patent: Apr. 5, 1994

[54] CIRCUIT FOR SLOWING PORTION OF MICROPROCESSOR OPERATING CYCLE IN ALL SUCCESSIVE OPERATING CYCLES REGARDLESS OF WHETHER A SLOW DEVICE IS ACCESSED IN THE PORTION OF ANY OPERATING CYCLE

[75] Inventor: Jürgen Plog, Hamburg, Fed. Rep. of Germany

[73] Assignee: U.S. Philips Corporation, New York, N.Y.

[21] Appl. No.: 758,980

[22] Filed: Sep. 9, 1991

[30] Foreign Application Priority Data

Sep. 19, 1990 [DE] Fed. Rep. of Germany ....... 4029598

[51] Int. Cl.$^5$ ............................ G06F 1/08; G06F 1/04
[52] U.S. Cl. ........................................ 395/550; 377/47;
377/106; 364/270; 364/270.1; 364/270.3;
364/271.1; 364/DIG. 1
[58] Field of Search ........................ 395/550, 800, 375;
377/47, 106

[56] References Cited

U.S. PATENT DOCUMENTS

| | | | |
|---|---|---|---|
| 4,458,308 | 7/1984 | Holtey et al. | 395/550 |
| 4,517,641 | 5/1985 | Pinheiro | 395/275 |
| 4,658,406 | 4/1987 | Pappas | 377/48 |
| 4,819,164 | 4/1989 | Branson | 364/200 |
| 4,910,671 | 3/1990 | Kitamura et al. | 395/575 |
| 5,163,146 | 11/1992 | Antanaitis, Jr. et al. | 395/550 |

FOREIGN PATENT DOCUMENTS 3813642 11/1989 Fed. Rep. of Germany .

Primary Examiner—Thomas C. Lee
Assistant Examiner—Paul Harrity
Attorney, Agent, or Firm—Anne E. Barschall

[57] ABSTRACT

Conventional microprocessors await the data on the bus for acceptance for a given number of processor clock signals after accessing an external device, notably after a read instruction for an external data memory. When a comparatively slow memory is used in conjunction with a fast microprocessor, it may occur that the data is not yet present at the anticipated instant. In microprocessors in which no hold state is provided it is known to reduce the clock frequency during the reading of the external memory until the data is actually available. However, this results in a fluctuating mean clock frequency of the microprocessor so that internal timing members, controlled by the clock, cannot determine defined periods of time. In accordance with the invention, the clock frequency is reduced during the part of the operating cycle of the microprocessor during which an external device can be accessed, the microprocessor operating at the maximum clock frequency during the remainder of the cycle. This also occurs when actually no access takes place, but the mean clock frequency of the microprocessor is then constant so that internal timing members can still utilize the clock signal. Steps are proposed to adapt the part of the operating cycle of the microprocessor during which the clock frequency is reduced as accurately as possible to the part of the cycle between the initiation of the access or the reading and the actual delivery of the data.

9 Claims, 2 Drawing Sheets

CIRCUIT FOR SLOWING PORTION OF MICROPROCESSOR OPERATING CYCLE IN ALL SUCCESSIVE OPERATING CYCLES REGARDLESS OF WHETHER A SLOW DEVICE IS ACCESSED IN THE PORTION OF ANY OPERATING CYCLE

FIELD OF THE INVENTION

The invention relates to a circuit arrangement for recurrently slowing down the program execution in a microprocessor, comprising a divider arrangement for controllably dividing the frequency of a clock signal by a first or a second divisor in order to generate a first clock signal having a first frequency or a second clock signal having a second frequency, the clock input of the microprocessor being connected to the output of the divider arrangement, the microprocessor requiring one or more cycles, each comprising a given number of clock pulses in order to execute a respective instruction and accessing an external device, notably a memory, during a given part of the cycle in an instruction-dependent manner.

A circuit arrangement of this kind is known from DE-OS 38 13 642 or U.S. Pat. No. 4,819,164 which both address approximately the same problem. Therein, the clock frequency of the microprocessor is reduced when it initiates an access to an external device such as a data memory, because after having initiated an access to an external device for a data exchange, notably for the reading of the desired data, the microprocessor requires a given number of clock phases after said exchange. Due to the reduction of the clock frequency, a longer period of time may elapse between the initiation of an access and the reception of data as when the microprocessor operates continuously at the maximum clock frequency.

An integrated circuit microprocessor, however, often comprises also internal timing members which count down a predetermined number of clock pulses. Such timing members serve, for example for controlling serial data interfaces. When the clock frequency of the microprocessor is not constant but is switched between two frequencies during the program execution in dependence on the various instructions, such internal timing members can no longer define constant, predetermined time periods.

SUMMARY OF THE INVENTION

Therefore, amongst other things it is an object of the invention to provide a circuit arrangement of the kind set forth which also enables a slower data exchange with, for example slow external devices and in which the internal timing members of the microprocessor, however, can still define or determine given time periods.

According to a first aspect of the invention this object is achieved in that in each cycle the divider arrangement generates a fixed first number of clock pulses having the first frequency and a fixed second number of clock pulses having the second frequency, regardless of whether or not the microprocessor actually performs an access operation, the sum of both numbers being equal to the number of clock pulses of a cycle.

The invention utilizes the fact that a data exchange with an external device can occur only in a given part of the clock cycle of the microprocessor, the clock frequency being each time reduced in said part. This reduction also takes place when the relevant instructions do not imply accessing of an external device, so that the mean clock frequency and hence the processing speed of the microprocessor is slightly reduced overall, but the mean clock frequency is thus constant again. Moreover, certain types of microprocessors are optimized for data accessing machine cycles, so that a cycle without data accessing would be an exception rather than the rule. Such microprocessors are often called digital signal processors which are useful for processing digital signal streams, for example those that represent audio and/or video signals.

In order to achieve such a fixed alternation of high and low clock frequencies for the microprocessor, according to a further aspect of the invention the divider arrangement comprises a first cyclic counter which receives the clock signal and which generates a second clock signal having a second, lower frequency, a controllable switch which optionally applies the clock signal or the second clock signal to an output of the divider arrangement, and a second counter and a third counter which both receive the clock signal on the output of the divider arrangement as counting pulses and which each comprise at least a stop input and a carry output, the carry output of the second and the third counter being connected to the stop input of the third counter and the second counter, respectively, so that both counters count only alternately, the carry output of one of the two counters controlling the switch. Because both counters always count alternately and count a predetermined number of clock pulses, a constant pattern of fast and slow clock pulses with a constant mean frequency is formed in synchronism with the machine cycle.

The parts of the microprocessor cycle during which the clock signal having the low frequency is applied to the microprocessor should be situated as well as possible in the part of the cycle during which an external device is accessed. According to a further aspect of the invention, this can be optimized in that the beginning of counting by the second and the third counter is controlled in dependence on the first appearance of a microprocessor access signal. Thus, the divider arrangement need not be synchronized with the cycle of the microprocessor. Even more accurate matching of the periods of high frequency and low frequency of the clock signal to the microprocessor cycle can be achieved according to a further aspect of the invention in that the divider arrangement comprises a fourth counter which, after the first appearance of a microprocessor access signal, counts a predetermined number of pulses of the clock signal until it reaches a predetermined final position and which generates a blocking signal until said final position is reached, which blocking signal blocks the counting by the second and the third counter. The fourth counter thus counts only once after the switching on of the supply voltage for the microprocessor or after a general reset signal upon the first appearance of the access signal, and subsequently only the second and the third counter count alternately so that the fourth counter produces merely a shift of the start of the alternation of the counting by the second and the third counter. As a result, the period with the clock signal of low frequency can be arbitrarily accurately situated in the optimum part of the microprocessor cycle.

BRIEF DESCRIPTION OF THE FIGURES

Embodiments of the invention will be described in detail herinafter with reference to the drawing. Therein.

DESCRIPTION OF A PREFERRED EMBODIMENT

Figure 1:
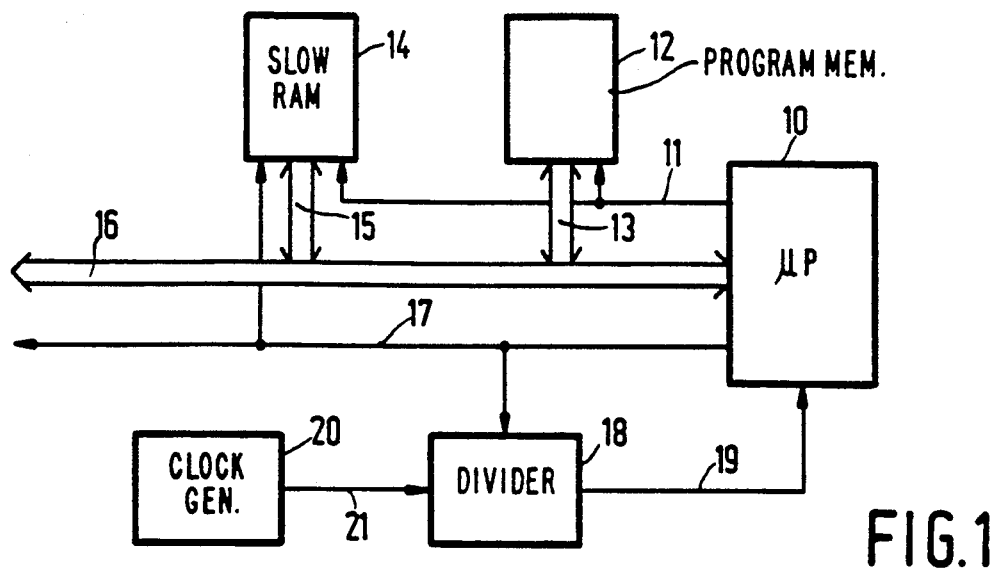
FIG. 1 shows a block diagram of a data processing system comprising a microprocessor and external devices.

FIG. 1 shows a part of a data processing system which comprises a microprocessor 10 as well as two external devices 12 and 14 which are assumed to be memories. The memory 12 is the program memory which contains the series of instructions and which is preferably constructed as a fast read-only memory, the memory 14 being a slower random access memory for data. From the microprocessor 10 an information bus 16 extends which actually consists of a number of parallel lines and via which data can be transported in both directions, i.e. from and to the microprocessor 10. The memories 12 and 14 are connected to the bus 16 via bidirectional connections 13 and 15, respectively. The information on the bus 16 may be, for example data or addresses, indicated by corresponding control signals on the connection 11 which extends from the microprocessor 10 to the memories 12 and 14. Customarily, the microprocessor 10 first transmits an address on the bus 16 and by way of control signals on the connection 11 it is indicated when these addresses are valid so as to be taken up by the relevant memory. Subsequently, the memory 12 or 14 reads the addressed memory location and transfers the data read, via the bus 16, to the microprocessor which accepts this data a predetermined period of time after the control signals on the connection 11. Via a line 17, originating from the microprocessor 10, there is also transmitted an access signal if instead of performing a read operation in the program memory 12, for example the data memory 14 is to be accessed. Further external devices, not shown for the sake of clarity, may also be connected to the bus 16 as well as to the control line 17 and possibly further control lines.

The procedure in the microprocessor 10 is controlled by clock signals which are applied via the line 19 and which are delivered by a divider arrangement 18. The latter arrangement receives a clock signal of fixed frequency from a clock generator 20, via the line 21, and divides this constant clock signal by two diferent divisors, so that two further clock signals of different frequency appear; via a switch, one of these two clock signals is output via the line 19. One divisor in the divider arrangement 18 is preferably equal to 1, i.e. the clock signal on the line 21 or a clock signal extracted therefrom by frequency division is output on the line 19. This switching over is controlled by the read control signal on the line 17.

Figure 2:
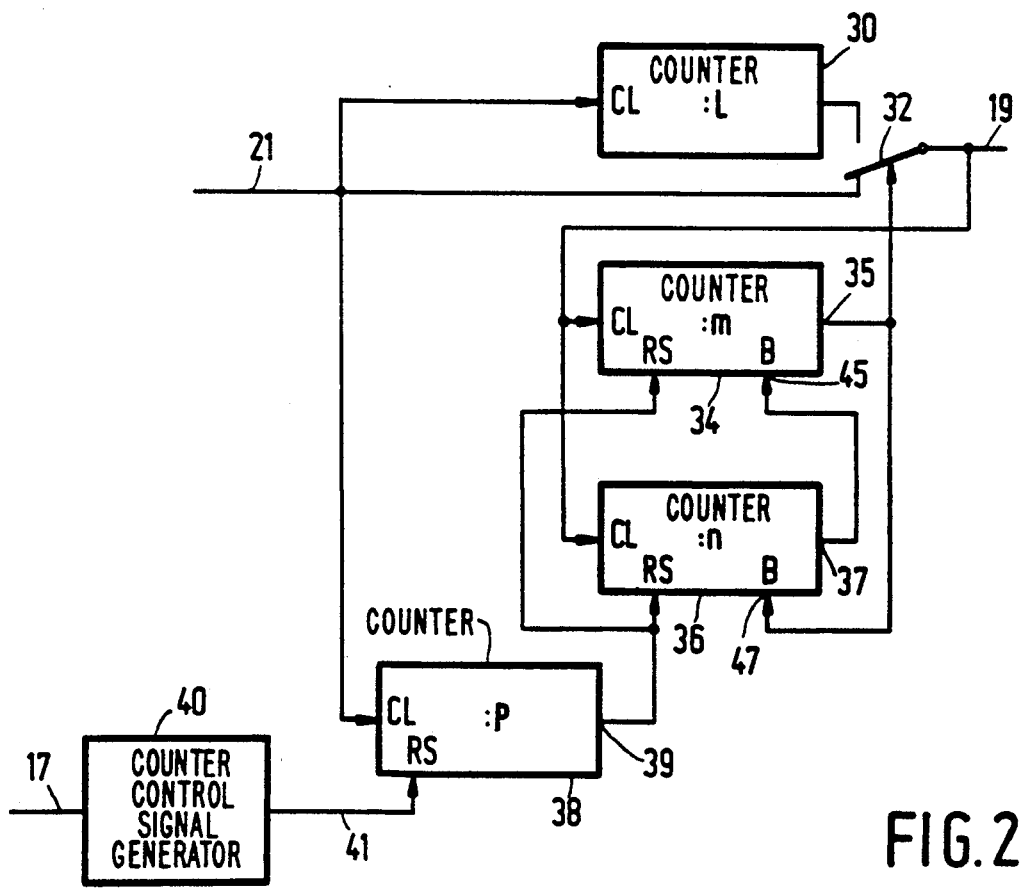
FIG. 2 shows a block diagram of the divider arrangement.

FIG. 2 shows an embodiment of the divider arrangement 18 in the form of a block diagram. The divider arrangement comprises a number of counters 30, 34, 36 and 38 which, using each time a clock signal received on the left-hand input CL, count a predetermined number of clock pulses, symbolically represented by a letter in the individual counters, once or cyclically, after which they reach a final position and deliver an output signal via the carry output at the right-hand side of the relevant block. The counters 34 and 36 also comprise a respective blocking input B(45, 47, respectively) which enables the counting of the relevant counter in dependence on the signal value on this input. The counters 34, 36 and 38 also comprise a reset input RS via which the counter is retained in a given position in response to a given signal.

The clock signal from the clock generator 20 in FIG. 1 is applied via the line 21; a switch 32 whose position is controlled by the signal on the output 35 of the counter 34 connects the line 19 either directly to the line 21 or to the output of the counter 30 which outputs a clock signal having a frequency which has been reduced by the factor L with respect to the clock frequency on the line 21. A unit 40 receives the access signal on the line 17 and, after switching on of the operating voltage for the entire arrangement, it generates a signal on the line 41 which retains the counter 38 in a predetermined position until an access control signal appears for the first time on the line 17. In this position, the counter 38 generates a signal on the output 39 which retains the two counters 34 and 36 in a respective predetermined position or which blocks their counting. As soon as an access signal appears on the line 17, the signal on the line 41 disappears and the counter 38 counts a number of P pulses of the clock signal on the line 21, after which it outputs a signal on the output 39 which blocks the further counting by the counter 38 and instead enables the counting by the counters 34 and 36. For this reason, the signal on the output 39 has been retrocoupled inside the counter 38 along an interconnection not shown for brevity. The counters 34, 36 receive the clock signal on the line 19 as the counting pulses. It is assumed that the signal on the output 39 of the counter 38 retains the counter 34 in a position in which it generates a signal on the carry output 35 which enables the counter 36 via the input 47, the latter counter generating a signal on the output 37 which blocks further counting by the counter 34 via the input 45, thus maintaining the signal on the output 35.

As soon as the counter 36, after having counted a number of n pulses of the clock signal on the line 19, reaches its final position and generates a signal on the output 37 which enables the counting by the counter 34, the signal on the output 35 of the counter 34 disappears so that the switch 32 is switched to the position shown and the further counting by the counter 36 is blocked via the input 47 so that the signal on the output 37 remains constant for the time being.

As soon as the counter 34 has counted m pulses of the clock signal on the line 19, a signal is again generated on the output 35 so that the switch 32 is switched over and the counter 36 is enabled to count further, the counting by the counter 34 being blocked by way of the signal on the output 37. Thus, the counters 34 and 36 alternately count m or n pulses and the switch 32 is also switched over in this alternating rhythm. The mean frequency $f_m$ of the clock signal on the line 19 for the microprocessor depends on the frequency $f_c$ of the clock signal on the line 21 as follows:

$$\frac{1}{f_m} = \frac{1}{m+n} \quad \frac{n}{f_c} + \frac{m}{f_c/L}$$

For k=m/n there is obtained $$f_m = f_c \frac{1+k}{1+k \cdot L}$$

Because the sum m+n is equal to the number of clock pulses of the microprocessor for one cycle, the mean frequency of the clock pulses in each cycle is constant and hence also in general for the microprocessor, so that timing elements in the microprocessor can operate at the microprocessor clock frequency notably for prolonged periods of time.

Figure 3:
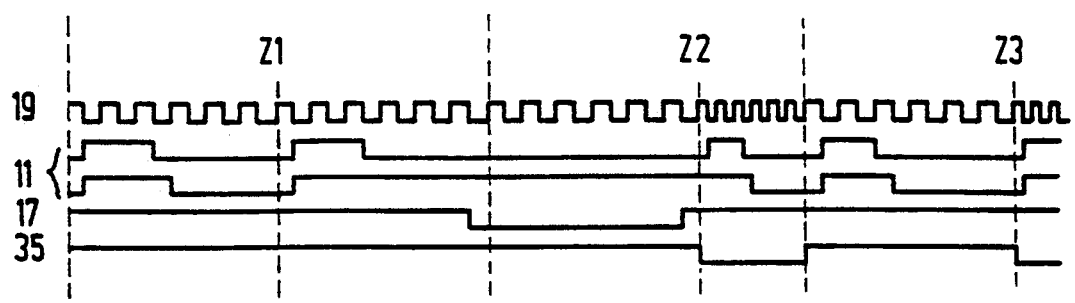
FIGS. 3 and 4 show pulse diagrams of various signals of the data processing system and the divider arrangement.
Figure 4:
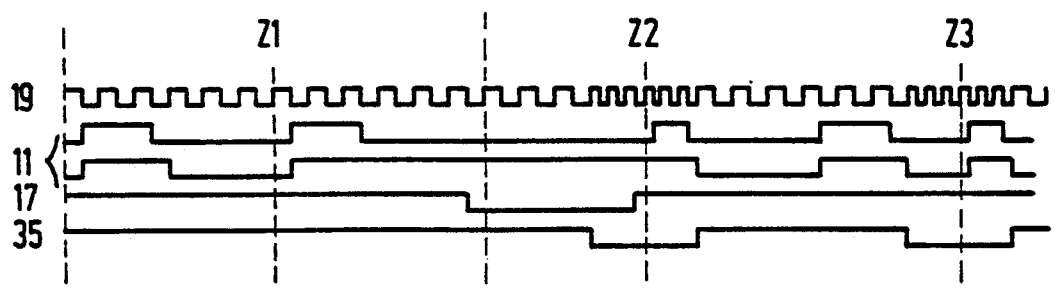

FIGS. 3 and 4 illustrate the relationship between the various frequencies of the clock signal on the line 19 and control signals of the microprocessor 10 in FIG. 1 as well as the signal on the output 35 of the counter 34 in FIG. 2 for controlling the switch 32. The numerals of the individual curves correspond to the reference numerals of the lines on which the relevant signals occur. In FIG. 3 it is assumed that the counter 38 is not present in FIG. 2, i.e. the line 41 corresponds directly to the point 39.

In the cycle Z1, the microprocessor initially receives a clock signal having a low frequency which amounts to half the frequency on the line 21 in FIG. 1 or FIG. 2. In response to the first trailing edge of this clock signal, two signals on the control line 11 from the microprocessor become high, so that a previously addressed instruction word is transferred to the microprocessor from the program memory 12. In response to the first trailing edge of this signal in the cycle Z1, an address generated by the microprocessor 10 is transferred to the memory 12 and in response to the lower signal the read instruction is given.

In response to the trailing edge of the first clock pulse after half the cycle Z1, also being denoted by a broken line in FIG. 3, the leading edges of the signals on the line 11 appear again, but it is assumed that at the beginning of the cycle Z1 an instruction for accessing an external memory was concerned, so that at the halfway point of the cycle no new instruction is taken over and the lower signal on the line 11 remains high. Instead, the inverted access signal on the line 17 becomes low at the end of the cycle Z1, so that the addressed memory location of the memory 14 is read. The data read is then transferred to the microprocessor a given number of clock pulses after the trailing edge of the upper signal on the line 11, i.e. the memory 14 must have actually delivered this data before this instant. However, when the memory 14 is comparatively slow in comparison with the operating speed of the microprocessor, the clock frequency of the microprocessor on the line 19 must be chosen so that when the microprocessor wishes to accept the data, the data has indeed been delivered by the memory. However, in the case of slow memories this frequency could be substantially lower than the maximum permissible clock frequency of the microprocessor.

In order to optimize the use of this operating speed, according to the example shown in FIG. 3 the clock frequency of the microprocessor is switched over, to a higher value, during the second half of the cycle Z2 by the signal transition on the output 35 of the counter 34 in FIG. 2, i.e. to double the frequency in the present case, because during this part of the cycles of the microprocessor no access to an external device or to an external data memory can occur and because, moreover, the acceptance of the data by the microprocessor has already been terminated. Thus, the cycle duration has been increased only 1.5 times with respect to the minimum cycle duration which would occur in the case of a constantly maximum clock frequency for the microprocessor. This transition from low to high clock frequency continues during the clock cycle Z3 and the subsequent clock cycles (not shown), even when no access to an external device occurs therein.

FIG. 4 shows the execution when the complete circuit shown in FIG. 2 is used, i.e. the circuit including the counter 38. The execution during the first cycle Z1 corresponds to FIG. 3 so that it will not be elucidated again. In response to the occurrence of the access signal on the line 17, the counter 38 in FIG. 2 is enabled, which counter counts a number of p pulses of the clock signal, i.e. three clock signals in the present case. As soon as these clock signals have been counted down and an enable signal for the counters 34 and 36 appears on the output 39 in FIG. 2, the output 35 of the counter 34 is directly switched over because initially it is retained by the signal on the output 37 of the counter 36 and does not count further, the switch 32 occupying the position shown and clock signal of high frequency being output at the output 19.

These clock signals are then counted by the counter 36 and after n pulses of the clock signal, being six pulses in the present example, a signal appears on the output 37 which enables the counter 34 so that at the same time the signal on the output 35 is switched over and clock pulses of low frequency are output on the line 19, i.e. a number of m pulses which again amounts to six in the present case, until the counter 34 reaches its final position and the signal on the output 35 is switched over, so that the counter 36 is switched on again etc. This alternation, commencing in the cycle Z2, continues in the cycle Z3 and the subsequent cycles. It can thus be achieved that the change-over from high to low clock frequency occurs exactly at the instant at which an access to notably an external memory takes place; the subsequent number of clock pulses of low frequency is then chosen so that the data is transferred from the memory to the microprocessor exactly at the end of said low frequency. Optimum, exact adaptation of the period with clock signals of low frequency to the period elapsing between initiation of the access and acceptance of data is thus possible, so that the microprocessor can operate at the maximum clock frequency at all other times.

I claim:

1. A circuit supplying clock signals to operate a microprocessor having a plurality of successive operating cycles, each of the operating cycles comprising a fixed number of clock pulses to execute an instruction and selectively access a device using a first clock signal and a second clock signal, respectively, the circuit comprising:

(a) a source of clock pulses, and
    (b) clock supplying means having an input connected to the source of clock pulses and an output connected to the microprocessor for generating at the output the first and second clock signals having first and second different clock frequencies, respectively, and alternately generating, during each of the successive microprocessor operating cycles a fixed first number of clock pulses of the first clock signal and a fixed second number of clock pulses of the second clock signal, the first and second numbers of clock pulses comprising a sum that is the same for each of the successive microprocessor operating cycles; whereby the clock supplying means supplies the fixed first and fixed second number of clock pulses for all of the successive microprocessor operating cycles regardless of whether the device is actually accessed by the microprocessor using the second clock signal in each of the successive microprocessor operating cycles.

2. A circuit as claimed in claim 1, wherein the sum equals the given number of clock pulses.

3. A circuit comprising:
(a) a device to be accessed by a microprocessor;
(b) said microprocessor having a plurality of successive operating cycles, each of the operating cycles comprising a given number of clock pulses to execute an instruction and selectively access said device using a first clock signal and a second clock signal, respectively;
(c) a source of clock pulses; and
(d) clock supplying means having an input connected to the source of clock pulses and an output connected to the microprocessor for generating at the output the first and second clock signals having first and second different clock frequencies, respectively, and alternately generating, during each of the successive microprocessor operating cycles a fixed first number of clock pulses of the first clock signal and a fixed second number of clock pulses of the second clock signal, the first and second numbers of clock pulses comprising a sum that is the same for each of the successive microprocessor operating cycles; whereby the clock supplying means supplies the fixed first and fixed second number of clock pulses for all of the successive microprocessor operating cycles regardless of whether the device is actually accessed by the microprocessor using the second clock signal in each of the successive microprocessor operating cycles.

4. A circuit as claimed in claim 3, wherein the sum equals the given number of clock pulses, and the device is accessed during the time interval that the clock pulses supplied to the microprocessor are from a lower frequency clock signal.

5. A circuit as claimed in claim 3, wherein the clock supplying means comprises a divider arrangement:
said divider arrangement comprising a first cyclic counter having an input connected to the source of clock pulses and an output for generating the second clock frequency which is lower than the first clock frequency, a controllable switch having an input controllably connected to the first cyclic counter output or the source of clock pulses and an output connected to the microprocessor, second and third counters each having clock and stop inputs and a carry output, the carry output of the second counter being connected to the stop input of the third counter and the carry output of the third counter being connected to the stop input of the second counter, whereby both the second and third counters count only alternately, the carry output of the second counter also being connected to and controlling the controllable switch.

6. A circuit as claimed in claim 5, further comprising a fourth counter having inputs connected to the source of clock pulses and to the microprocessor and an output connected to the second and to the third counters to control when the second and third counters start counting.

7. A circuit as claimed in claim 6, wherein the fourth counter is configured to normally output a signal blocking counting by the second and third counters but in response to counting a predetermined number of clock signal pulses upon receiving a control signal from the microprocessor generates a signal enabling the second and third counter.

8. A circuit as claimed in claim 5, wherein the source of clock pulses constitutes the first clock signal at the higher frequency.

9. A circuit comprising:
a microprocessor having a plurality of successive operating cycles, each of the operating cycles comprising a given number of clock pulses to execute an instruction and selectively access a device using a first clock signal and a second clock signal, respectively;
a source of clock pulses; and
clock supplying means having an input connected to the source of clock pulses and an output connected to the microprocessor for generating at the output the first and second clock signals having first and second different clock frequencies, respectively, and alternately generating, during each of the successive microprocessor operating cycles a fixed first number of clock pulses of the second clock signal and a fixed second number of clock pulses of the second clock signal, the first and second numbers of clock pulses comprising a sum that is the same for each of the successive microprocessor operating cycles; whereby the clock supplying means supplies the fixed first and fixed second number of clock pulses for all of the successive microprocessor operating cycles regardless of whether the device is actually accessed by the microprocessor using the second clock signal in each of the successive microprocessor operating cycles.

* * * * *